United States Patent [19]
Davis et al.

[11] Patent Number: 5,841,589
[45] Date of Patent: *Nov. 24, 1998

[54] PANORAMIC OPTICS ASSEMBLY HAVING AN INITIAL FLAT REFLECTIVE ELEMENT

[75] Inventors: John E. Davis, Claremont, Calif.; Kenneth R. Castle, Tucson, Ariz.; Marion N. Todd, Monrovia, Calif.; Tilman W. Stuhlinger; Mitchell Ruda, both of Tucson, Ariz.

[73] Assignee: Boeing North American, Inc., Seal Beach, Calif.

[*] Notice: The term of this patent shall not extend beyond the expiration date of Pat. No. 5,502,309.

[21] Appl. No.: 533,801

[22] Filed: Sep. 26, 1995

[51] Int. Cl.⁶ .............................. G02B 17/00; G02B 13/06
[52] U.S. Cl. ......................... 359/726; 359/363; 359/725; 250/353
[58] Field of Search ........................... 359/363, 399–403, 359/405–406, 429–430, 725–726, 732, 715; 250/332, 334, 352–353

[56] References Cited

U.S. PATENT DOCUMENTS

| | | | |
|---|---|---|---|
| 1,797,867 | 3/1931 | Karnes | 359/833 |
| 1,959,702 | 5/1934 | Barker | 340/524 |
| 2,244,235 | 6/1941 | Ayres | 359/504 |
| 2,638,033 | 5/1953 | Buchele et al. | 359/725 |
| 2,923,220 | 2/1960 | Bouwers | 396/22 |
| 3,151,524 | 10/1964 | Bouwers | 359/725 |
| 3,203,328 | 8/1965 | Brueggemann | 396/21 |
| 3,283,653 | 11/1966 | Tokarzewski | 359/725 |
| 3,514,186 | 5/1970 | Poncelet | 359/725 |
| 3,552,820 | 1/1971 | Brachvogel | 359/725 |
| 3,781,559 | 12/1973 | Cooper et al. | 250/334 |
| 3,894,798 | 7/1975 | Wolf | 353/122 |
| 3,977,793 | 8/1976 | Trotta | 356/218 |
| 3,998,532 | 12/1976 | Dykes | 352/69 |
| 4,012,126 | 3/1977 | Rosendahl et al. | 359/725 |
| 4,118,622 | 10/1978 | David | 359/725 |
| 4,395,093 | 7/1983 | Rosendahl et al. | 359/725 |
| 4,429,957 | 2/1984 | King | 359/725 |
| 4,446,372 | 5/1984 | Gurnee | 250/334 |
| 4,463,357 | 7/1984 | MacDoran | 342/460 |
| 4,566,763 | 1/1986 | Greguss . | |
| 4,567,367 | 1/1986 | Brown de Colstoun et al. | 250/340 |
| 4,977,323 | 12/1990 | Jehle | 250/332 |
| 4,994,670 | 2/1991 | Noble et al. | 250/235 |
| 5,049,756 | 9/1991 | Brown de Colstoun et al. | 250/554 |
| 5,160,842 | 11/1992 | Johnson | 250/338 |
| 5,181,145 | 1/1993 | Eden | 359/859 |
| 5,218,345 | 6/1993 | Muller et al. | 340/578 |
| 5,281,815 | 1/1994 | Even-Tov | 250/339 |
| 5,402,168 | 3/1995 | Fouilloy | 348/164 |
| 5,452,135 | 9/1995 | Maki | 359/725 |
| 5,502,309 | 3/1996 | Davis | 250/353 |

FOREIGN PATENT DOCUMENTS

| | | |
|---|---|---|
| 878162 | 8/1971 | Canada . |
| 222522 | 1/1990 | Japan . |
| 1155549 | 6/1969 | United Kingdom ................... 359/725 |

OTHER PUBLICATIONS

"Lens Desgn"by Milton Laikin, Laikin Optical Corporation, title page, Fig. 9–5 and p. 98.

*Primary Examiner*—Thong Nguyen
*Attorney, Agent, or Firm*—Lawrence N. Ginsberg; Charles T. Silberberg

[57] ABSTRACT

An optics assembly for observing a panoramic scene comprises a plurality of optical elements. A flat reflective element redirects light from a panoramic scene. A plurality of refractive elements, successively receive the redirected light from the reflective element and create a real pupil. An optical relay system receives light from a last of the plurality of refractive elements. The optical relay system establishes the focal length of the optics assembly, corrects optical aberrations produced at the real pupil, corrects field aberrations and produces an annular image on a flat focal plane assembly. The optics assembly produces a small F-number at field angles perpendicular to the optical axis of the optics assembly over a panoramic scene.

2 Claims, 4 Drawing Sheets

PANORAMIC OPTICS ASSEMBLY HAVING AN INITIAL FLAT REFLECTIVE ELEMENT

BACKGROUND OF THE INVENTION

1. Field of the Invention

This invention relates to optical systems, and more particularly, to optical systems for imaging panoramic scenes onto flat focal planes.

2. Description of the Related Art

Existing wide field sensors do not combine an efficient staring optical system which provides a panoramic format with azimuth capability to 360 degrees with a simple optical system, and with a focal plane format capable of supporting a single square or rectangular focal plane. Fish eye lenses and their derivatives can have grossly distorted pupils as their field angle increases. The larger field angles of the fish eye lenses can have a pupil providing less than ten percent of the pupil area of the central system. This yields significant distortion in elevation resolution and reduction in sensitivity at higher angles off of the prime axis. Resultant systems providing similar performance are thus relatively large and costly. Scanning systems have long revisit times or large optics to provide sensitivity at very fast scan times.

U.S. Pat. No. 5,402,168, issued to J. Fouilloy, discloses a camera concept which entails an optomechanical projector and scanning system.

U.S. Pat. No. 4,994,670, issued to M. Noble et al, discloses a dither scanned, multiple aperture panoramic sensor.

U.S. Pat. No. 4,566,763, issued to P. Greguss, discloses an imaging block in which light rays pass across the prime axis of the initial optics. The invention has an exit pupil. There is only one significant optically powered surface for producing the image.

U.S. Pat. No. 4,446,372, issued to M. Gurnee, discloses a detector cold shield.

U.S. Pat. No. 4,395,093, issued to G. Rosendahl et al., describes a pair of hyperbolic reflective surfaces, which are used to image onto a complex arrangement of refractive elements to perform color correction and field corrections.

U.S. Pat. No. 4,012,126, issued to G. Rosendahl et al., describes a pair of hyperbolic reflective surfaces, which are used to image onto a complex arrangement of refractive elements to perform color corrections and field corrections.

U.S. Pat. No. 3,998,532, issued to W. Dykes, discloses a projection device for use with film. The final optical elements are a convex-convex reflector and a window.

U.S. Pat. No. 3,977,793, issued to P. Trotta, discloses a scanning radiation energy receiver.

U.S. Pat. No. 3,894,798, issued to J. Wolfe, discloses a scanning invention.

U.S. Pat. No. 3,781,559, issued to E. Cooper et al., discloses a procedure for scanning a field with various fields of view.

U.S. Pat. No. 3,552,820, issued to H. Brachvogel, describes a refractive first element set, which then directs energy to a re-imaging group.

U.S. Pat. No. 3,514,186, issued to E. F. Poncelet, has deficiencies that are similar to that of the W. A. Ayres (2,244,235) invention. Poncelet's first element is a sphere with the image refracted through it. Ayres' first element, on the other hand, is a reflecting sphere.

U.S. Pat. No. 3,283,653, issued to A. R. Tokarzewski, discloses an all refractive design with many complex annular lens shapes, including conical sections.

U.S. Pat. No. 3,203,328, issued to H. Brueggemann, discloses a device in which the optical path includes a hyperbolic surface followed by a spherical surface. The focal plane configuration necessitated by this optical path requires an annular focal plane. The energy traveling from the primary to the spherical secondary optics passes through the center of the focal plane. This prevents the concept from being used with conventional focal planes.

U.S. Pat. No. 's 2,923,220 and 3,151,524, issued to A. Bouwers, disclose inventions having wide angle camera lenses whose first element is a reflective torroid.

U.S. Pat. No. 2,638,033, issued to D. R. Buchele, describes a refractive concept similar to U.S. Pat. No. 4,566,763 noted above.

U.S. Pat. No. 2,244,235, issued to W. A. Ayres, describes a reflective spherical first element. This approach results in unacceptable distortion. The higher angles of elevation are very foreshortened on the focal plane, while the lower angles of elevation are severely limited in azimuthal resolution.

U.S. Pat. No. 1,797,867, issued to J. C. Karnes discloses panoramic or omniscope optics, which includes, as the first element, a convex/concave reflective element. This approach has significant problems producing a resolved image and pupil. The implementation of a focal plane region is a dispersed torroidal section which does not support an economical focal plane arrangement.

Canadian Patent No. 878,162, issued to D. Rees, describes a panoramic viewing system using a television system. The invention teaches a torroidal transmissive first element.

Japanese Patent No. 63-172209, issued to Y. Tamagawa, describes a procedure for limiting the off axis radiation to an infra red detector.

SUMMARY OF THE INVENTION

The present invention is an optics assembly for observing a panoramic scene at angles of incident greater than 90° from the optical axis. The optics assembly includes a plurality of optical elements. A first element is preferably a flat mirror mounted orthogonally to the prime axis of a reimaging group comprising a plurality of refractive elements. The flat mirror is mounted on 6r close to the first element of the reimaging group. The reimaging group may be a wide angle fish eye type lens or other wide field reimager. The flat mirror is used to transform the panoramic image arriving at greater than 90° from the optical axis into a panoramic image at less than 90°. The transformation to a narrower field image is a fundamental principle of this invention. The flat mirror is preferably mounted orthogonally to the optical axis of the reimaging group so that the chief rays of the reimaging group point upward while the imaged scene is below the local horizon. There are no inherent obstructions in the annular field of view of the sensor. An optical relay system receives light from the reflected scene, establishing the focal length of the optics assembly, correcting pupil aberrations produced at a real pupil formed by the reimaging group, correcting field aberrations and producing an annular image of 90° or greater on a flat focal plane assembly. The optics assembly produces a small F-number at field angles near perpendicular to the output optical axis of the optics assembly over a panoramic scene.

The invention enables higher efficiency energy collection at angles of 90° or greater from the optical axis with less geometric distortion in elevation field angle than a refractive fish eye lens, while retaining the panoramic capability up to 360°. The optics assembly produces a small F-number for incident field angles from light from the panoramic scene at greater than 90° from the output optical axis of the optics assembly. As used herein, the term "F-number" refers to the focal length divided by the effective aperture. The term "small" refers to an F-number less than 1.5.

The present invention provides compact and economically producable optics with high potential spatial resolution. It allows the use of conventional focal plane arrays, either as single units reading out the entire panoramic scene or, utilizing multiple focal planes, each reading out a segment of the scene, while not requiring that the focal planes be closely abutted.

All embodiments of the invention include multiple surfaces for correcting the image. These surfaces allow improved resolution and field flattening at the focal plane. The key elements in this invention are the improvement in performance over a conventional fish eye lens of similar field angles, the lack of obstructions inherent in mounting the sensor with the electronics all below the aperture, and the expected low cost to manufacture the sensor.

The optics assembly of the present invention collects energy from a panoramic scene at angles greater than 90° and less than 145° from the optic axis in the visible or infrared spectrum, and may present the imaged data for analysis or action against threats such as forest fires or invasion of a perimeter around a mast or tower. This sensor is a staring system, which results in a very efficient temporal collection mode with high dwell time.

Other objectives, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference characters.

DETAILED DESCRIPTION OF THE PREFERRED EMBODIMENT

Figure 1:
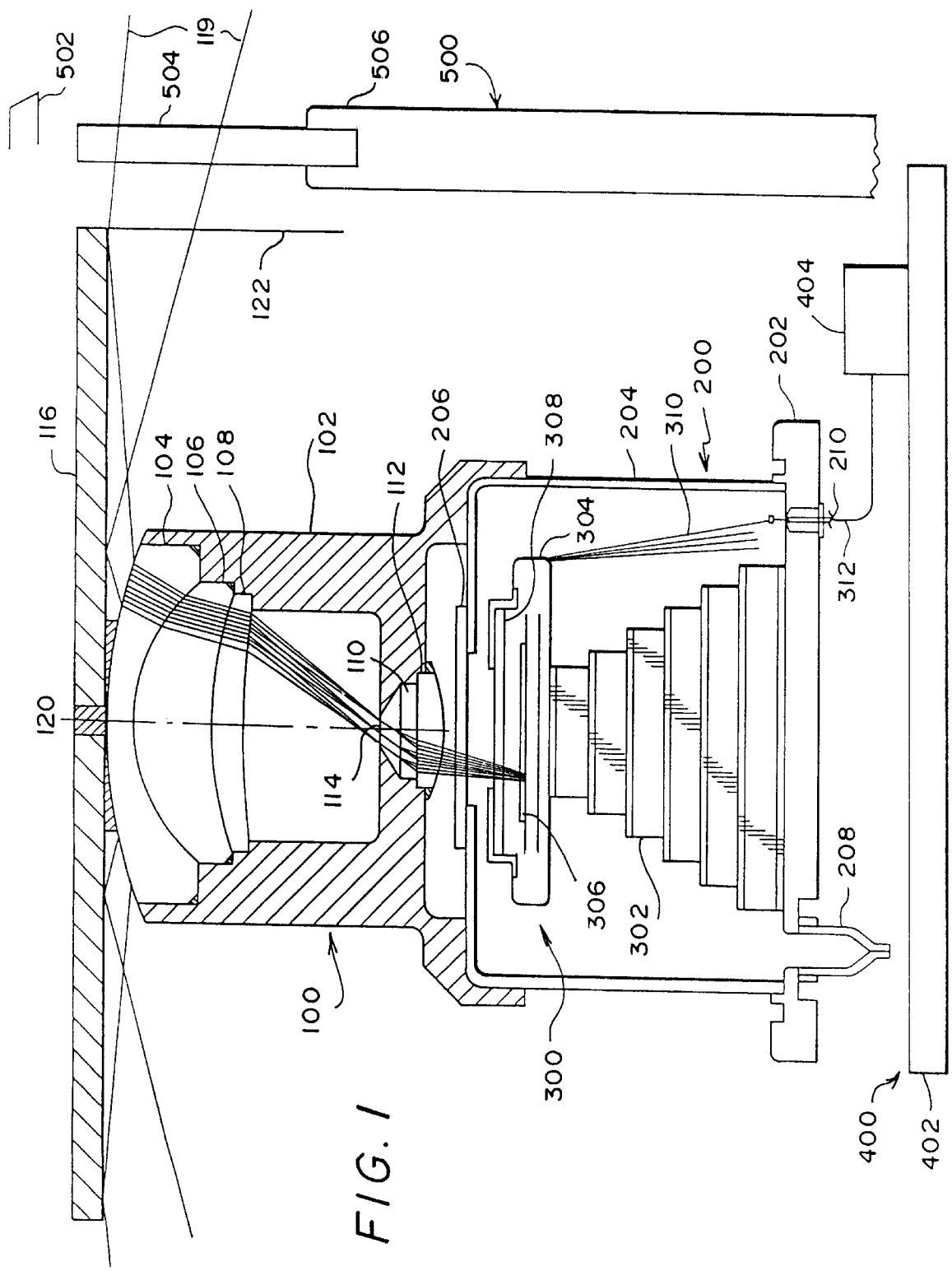
FIG. 1 is a diagrammatical, cross-sectional illustration of the arrangement and association of elements of a first embodiment of an optics assembly incorporating the subject invention therein, in relation to the optical functions thereof.
Figure 2:
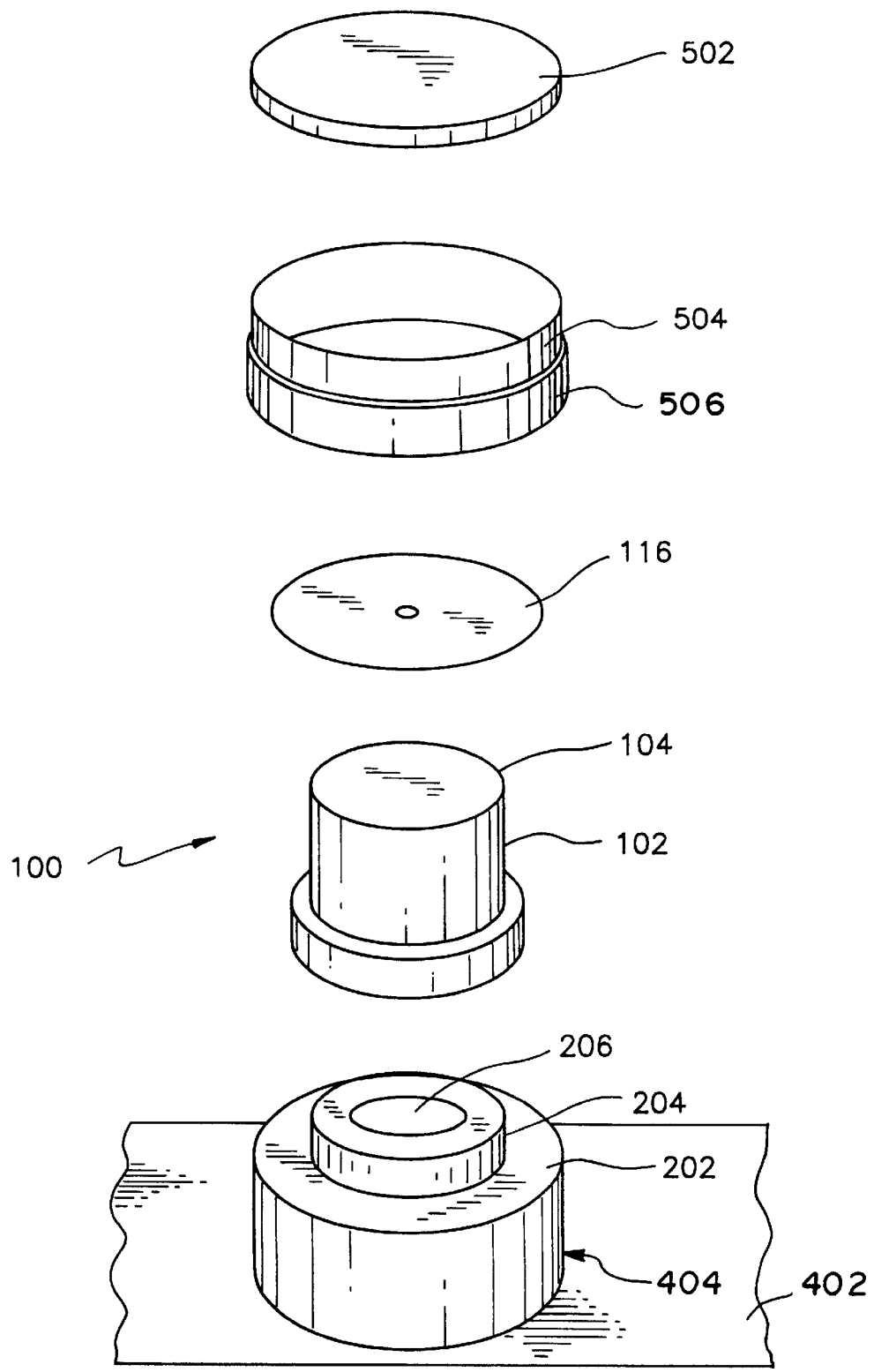
FIG. 2 is an exploded perspective illustration of the embodiment of FIG. 1, with some components omitted for the purpose of clarity.

Referring now to the drawings and to the characters of reference marked thereon, FIGS. 1 and 2 illustrate a preferred embodiment of the optics assembly of the present invention, designated generally as 100. Optics assembly 100 is supported by a dewar assembly, designated generally as 200. The dewar assembly 200 also supports a focal plane assembly and cooler, these two items collectively being designated generally as 300. An environmental cover is provided, designated generally as 500. The dewar assembly 200 serves as an interface between the optics assembly 100 and the electronics, the sensor mounting, and any other ancillary components such as antennas, solar power panels, etc., these items collectively being designated as 400.

The external environmental assembly 500 comprises a roof 502, a cylindrical optical window 504 and an environmental close out 506 which completes the physical box enclosing the optics assembly 100, the ancillary components 400, and the dewar assembly 200. A cooler assembly 302 is attached to a support structure 202 in turn attached to a mounting plate 402. The cooler 302 may be, for example, a standard thermoelectric cooler available from a variety of manufacturers. A dewar shell 204 is sealed to the structure 202 and a window 206. A pinch-off tube 208 is provided for evacuation of the dewar assembly 200. Electrical feed-throughs 210 are provided in the structure 202. The cooled portion of a detector housing 304 is mounted on the cooler 302. This is a standard component in the industry. A flat focal plane assembly 306 comprises a standard array focal plane such as a 256×256 Mercury Cadmium Telluride array available from Rockwell International. A cold filter 308 provides a limited bandwidth of radiation to the focal plane assembly 306, enhancing the sensitivity of the focal plane assembly. The surfaces of the inside of the dewar 204 and the outside of the detector housing 304 are coated to minimize heat transfer between the two surfaces. Electrical wires 310 from the focal plane assembly 306 and temperature sensor (not shown) to the feed-throughs 210 are preferably made of extremely fine wire formed of nickel, Constantin™ or Manganin™ to reduce the thermal energy lost across the wires. Wires 312 connect the feed-throughs 210 to the electronics 404.

The top of the dewar shell 204 supports the optics housing 102 of the optics assembly 100. The optics housing 102 supports a plurality of refractive elements 104, 108 and an optical relay system 112. (The optical relay system may contain additional refractive elements.) Variations in the design can require more or less refractive elements depending on the degree of fidelity required in the image of the scene. Refractive elements 104, 108 bring in the light from the wide angle fish eye type angles to image at a real pupil 114. Elements 104, 108 may be formed of, for example, silicon or germanium. There is a region 106 between elements 104 and 108. In a configuration requiring greater precision in the size of the blur circle the regions occupying 104, 106, and 108 may be populated with a lens triplet comprising a Zinc Selenide lens, a Germanium lens, and a Zinc Selenide lens. The pupil is then reimaged by optical relay system 112 onto the focal plane assembly 306. The optical relay system 112 may comprise silicon components. If greater fidelity is required in the blur circle due to smaller pixel elements as would be found with a 1024×1024 size array, then the space 110 above the optical relay system 112 could be filled with an additional silicon lens. A flat reflective element or plate 116 is mounted on the top of refractive element 104 and is axially symmetric with the primary axis, i.e. optical axis 120, of the optical system 100.

During operation the incoming energy from the panoramic scene with an elevation angle from about −5 degrees to about −45 degrees from the horizontal, i.e., 95° to 135° from the optic axis, represented by numeral designations 119 enters an aperture 122 and is reflected by the flat reflective element 116. (The direction of optical axis 120 is defined as originating in the lens set and directed to the scene.) The energy is transferred to the real pupil 114 and thence to the optical relay system 112. The optical elements 116, 104, 108, 112 provide a wide angle flat image of the scene through the window (vacuum close-out) 206 and the cold filter 308. The remaining energy is focused on the focal plane assembly 306.

FIG. 2 shows the roof 502 of the environmental enclosure 500 and cylindrical optical window 504 which seats against frame or environmental close-out 506 which rests on the mounting plate 402. The dewar shield 204 and window 206 are mounted on the structure 202 which is, itself, the top of the electronics package 404. The optics housing 102 is mounted on, and optically registered to, the dewar shell 204. The first refractive element 104, and the flat reflective plate 116 are shown.

Figure 3:
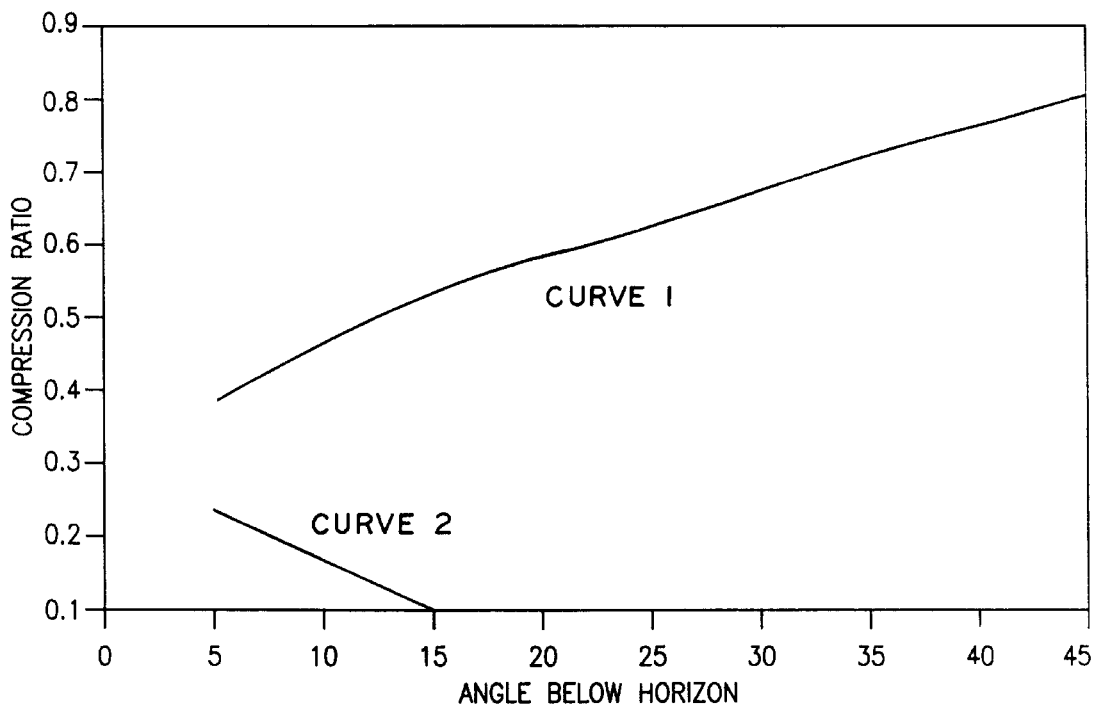
FIG. 3 is a graph comparing compression ratios of a typical fish eye lens and the present invention, as a function of elevation angle for a typical implementation.

Curve 2 of FIG. 3 illustrates the effect of compression of the real pupil in a conventional fish eye lens designed for a 210 degree field of regard. The data for this figure are extracted and modified from the book "Lens Design" by Milton Laikin of Marina Del Rey, Calif. If a fish eye lens is used to image below the horizon with the chief ray of the lens looking at the nadir position (i.e. directly downward) the capability of the group is shown in curve 1. The problem with the arrangement producing curve 1 is that the support structure will block a portion of the view. Curve 2 is clearly lacking in sensitivity at the angles of greatest interest. When the principles of the present invention are used, the compression ratios of Curve 1 are produced with the chief ray pointing at the zenith. The support structure does not block portions of the field of view. The variation in compression ratios −5° to −45° is less than a factor of two over this range of 40 degrees.

Figure 4:
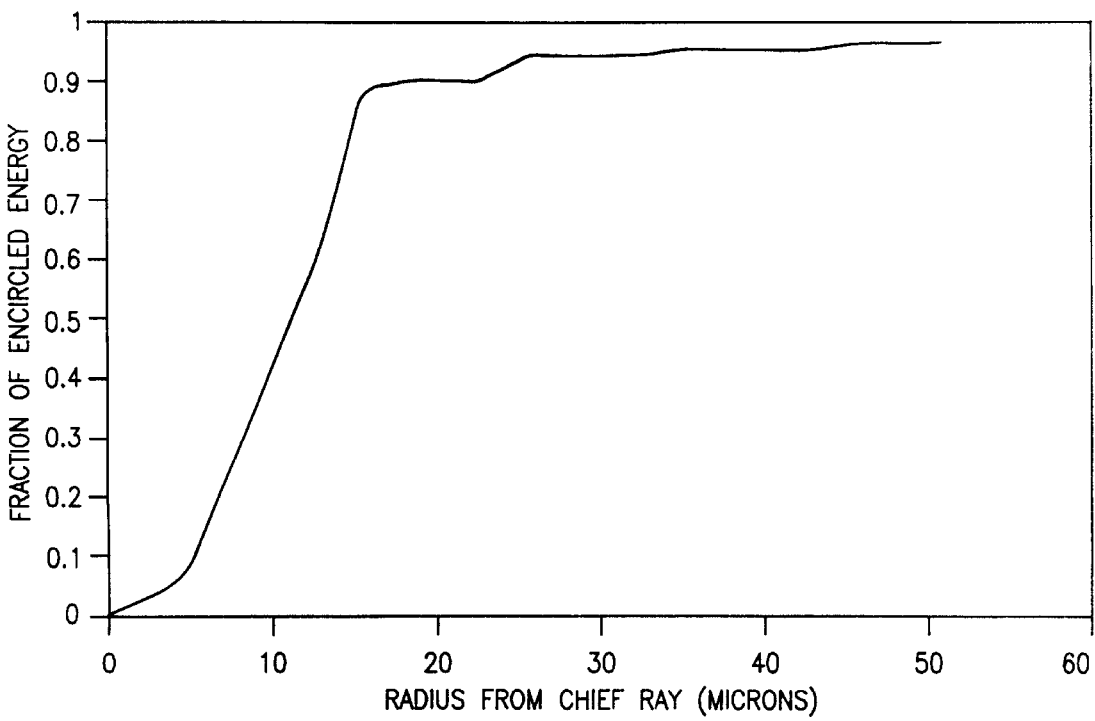
FIG. 4 is a graph of the fraction of encircled energy versus radius from centroid (microns), illustrating the polychromatic and geometric encircled energy.

FIG. 4 shows the predicted function of encircled energy for −15° observations as a function of radius from the image centroid. These polychromatic encircled energy plots are computed using ZEMAX computer software for a 256 pixel wide field of view. This figure shows that a characteristic spot diameter will be smaller than 30 microns diameter. This is established at the 82% encircled energy level.

Figure 5:
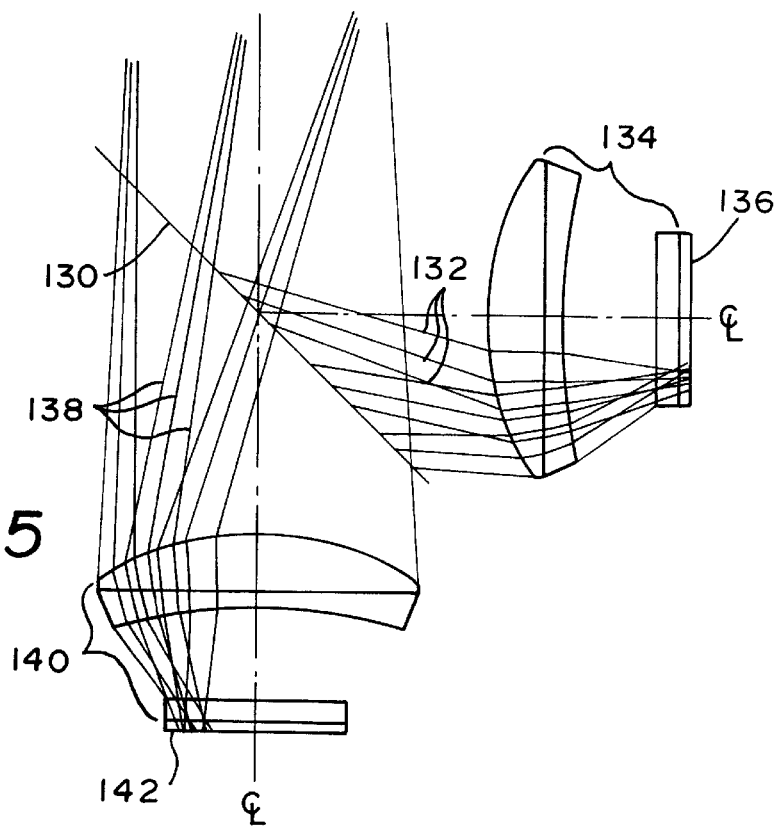
FIG. 5 is an optical ray trace diagram showing the use of multiple focal planes resulting in instantaneous fields of view in two different spectral bands.

FIG. 5 shows how multiple focal planes can be used when an enhanced or a two-color instantaneous field of view (IFOV) is required. A dichroic beam splitter or a shared energy beam splitter 130 is positioned to receive light from a last of a plurality of refractive elements 108 (not shown in this figure). The dichroic beamsplitter reflects one wavelength band and transmits another. A first portion of received light 132 is reflected and directed through a first re-imaging optical group 134 and onto a first flat focal plane subassembly 136 of a flat focal plane assembly. A second portion 138 of the received light is transmitted and directed through a second, identical reimaging optical group 140 and onto a second flat, focal plane subassembly 142 of the flat focal plane assembly. When a shared energy beam splitter is used, then multiple focal planes are employed to enhance resolution. The first and second focal plane subassemblies 136, 142 are clocked with respect to each other so as to allow focal planes of each respective focal plane subassembly to be optically abutted. The penalty for this implementation is cost. A larger single focal plane is understood to be an improved cost effective method of enhancing the resolution. The focal planes of each group are clocked, as noted above, to allow a small overlap between the focal planes of the two focal plane subassemblies. The beam splitter 130 is divided into sections containing three regions. The first region sends 90 percent of the incoming energy to a single focal plane group. There is a small intermediate region where energy is split between the two focal planes. This region results in over 45 percent of the energy falling on each focal plane. The third region sends 90% of the incoming energy to the second focal plane group.

Figure 6:
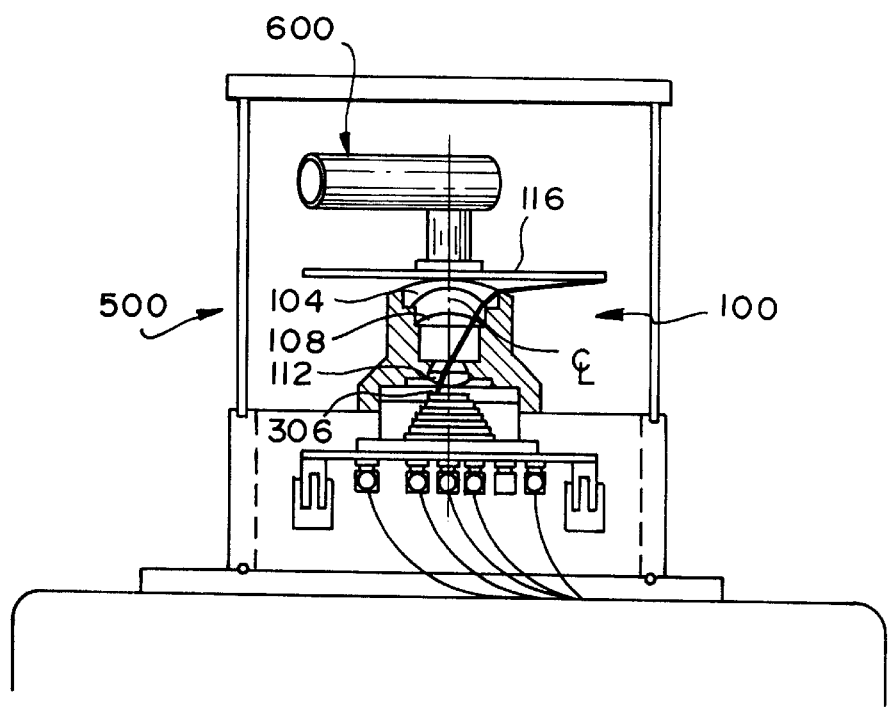
FIG. 6 is a perspective view, partially in cross section, illustrating the utilization of the principles of the present invention with a telescope for enhanced small field resolution utilizing focal plane area otherwise unused.

FIG. 6 shows the addition of a telescope 600 to the optics assembly 100 discussed above. The telescope 600 is preferably of a two-axis gimbaled narrow field-of-view type. Telescope 600 is mounted on the flat reflective element 116. The telescope 600 collects augmented light imagery and transmits the augmented light imagery through an opening formed in the flat, reflective element 116. The telescope 600 is capable of being pointed in a desired direction. The augmented light energy is transmitted through refractive elements 104, 108 and 112 to form a focused image in the center of the flat focal plane assembly 306, which in other circumstances would be unused. The telescope is driven in elevation and azimuth to observe information in a much smaller field of regard than the panoramic optics assembly without this enhancement with an inherent high IFOV for identification of desired specific objects detected by the wide field sensor. The telescope 600 is driven to the desired field-of-view by knowing the location from the wide field sensor. The impact of this enhancement is substantial. For example, when the telescope is pointed in the correct direction, the image produced has the potential to detect facial characteristics or license plate numbers.

It is understood that the inventive concepts described herein are applicable over a wide range of sizes and IFOV'S. If the F/# is held constant, the size of the collecting optics is determined by the physical size of the focal plane array (FPA). The IFOV resolution of the optical system is determined by the number of pixels in the annular plane. For convenience, the equivalents of area-to-focal plane inscribed diameter is used. If the $256^2$ FPA has a nominal IFOV of 8 milliradians, then a $1024^2$ FPA will have an IFOV of 256/1024 or ¼ of that of the 256, or in other words, a 2 milliradian IFOV.

Size of the optics assembly is directly proportional to the FPA width, and resolution is inversely proportional to the number of pixels in the inscribed diameter. As the resolution of the sensor is improved (i.e., the IFOV becomes smaller), the number of optical elements increases in a step-wise manner.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An optics assembly for observing a panoramic scene, comprising:
   a plurality of optical elements, comprising:
   a flat reflective element for re-directing light from a panoramic scene;
   a plurality of refractive elements for successively receiving said redirected light from said reflective element and creating a real pupil;
   an optical relay system for receiving light from a last said plurality of refractive elements and producing an annular image on a flat focal plane assembly;
   wherein said optics assembly produces a flat image for field angles from said light from said panoramic scene at near perpendicular angles to an optical axis of the optics assembly.

2. The optics assembly of claim 1, wherein said optical relay system, comprises:

a beam splitter positioned to receive light from said last of said plurality of refractive elements;

a first portion of said received light being reflected and directed through a first re-imaging optical group and onto a first flat focal plane subassembly of said flat focal plane assembly; and a second portion of said received light being transmitted and directed through a second re-imaging optical group and onto a second flat focal plane subassembly of said flat focal plane assembly, said first and second flat focal plane subassemblies being clocked with respect to each other so as to allow focal planes of each respective plane subassembly to be optically abutted.

* * * * *